United States Patent
Arai et al.

(10) Patent No.: US 9,233,594 B2
(45) Date of Patent: Jan. 12, 2016

(54) COOLING DEVICE AND VEHICLE EQUIPPED WITH THE SAME, AND CONTROL METHOD FOR COOLING DEVICE

(75) Inventors: Kunihiko Arai, Owariasahi (JP); Yoshiaki Kawakami, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/379,648

(22) PCT Filed: Feb. 23, 2012

(86) PCT No.: PCT/JP2012/054401
§ 371 (c)(1),
(2), (4) Date: Aug. 19, 2014

(87) PCT Pub. No.: WO2013/125005
PCT Pub. Date: Aug. 29, 2013

(65) Prior Publication Data
US 2015/0013363 A1    Jan. 15, 2015

(51) Int. Cl.
*B60H 1/32* (2006.01)
*B60H 1/00* (2006.01)
*F25B 41/04* (2006.01)
(Continued)

(52) U.S. Cl.
CPC ............ *B60H 1/00392* (2013.01); *B60H 1/323* (2013.01); *F25B 6/04* (2013.01); *F25B 41/04* (2013.01); *F25B 45/00* (2013.01); *F25B 49/027* (2013.01); *B60H 2001/00307* (2013.01); *F25B 5/02* (2013.01); *F25B 43/006* (2013.01); *F25B 2400/16* (2013.01); *F25B 2400/23* (2013.01); *F25B 2600/2523* (2013.01); *F25B 2700/04* (2013.01); *F25B 2700/195* (2013.01); *F25B 2700/1931* (2013.01)

(58) Field of Classification Search
CPC .... F25B 43/006; F25B 45/00; F25B 2400/16; F25B 2400/23; F25B 2600/2523
See application file for complete search history.

(56) References Cited

U.S. PATENT DOCUMENTS 4,122,688 A * 10/1978 Mochizuki ................ F25B 5/02
62/196.1
5,189,885 A * 3/1993 Ni ........................... F25B 41/00
62/117

(Continued)

FOREIGN PATENT DOCUMENTS

JP    A-02-219968    9/1990
JP    A-06-255351    9/1994

(Continued)

*Primary Examiner* — Jonathan Bradford
(74) *Attorney, Agent, or Firm* — Oliff PLC

(57) ABSTRACT

A cooling device utilizes a vapor compression refrigeration cycle including a compressor, a condenser, a receiver, an expansion valve, an evaporator, and an accumulator to cool a heat source with a coolant. The receiver separates the coolant having been subjected to heat exchange by the condenser into gas and liquid. The accumulator separates the coolant having been subjected to heat exchange by the evaporator into gas and liquid. The cooling device opens a switch valve capable of bringing the receiver and the accumulator into communication with each other to move the coolant liquid in the accumulator to the receiver. The cooling device restores the pressure difference between the receiver and the accumulator after the movement of the coolant liquid to the pressure difference before the movement of the coolant liquid by a pressure regulating unit.

17 Claims, 9 Drawing Sheets

(51) Int. Cl.
  *F25B 45/00* (2006.01)
  *F25B 6/04* (2006.01)
  *F25B 49/02* (2006.01)
  *F25B 5/02* (2006.01)
  *F25B 43/00* (2006.01)

(56) References Cited

U.S. PATENT DOCUMENTS 6,311,507 B1 * 11/2001 Gameiro ............... F25B 43/006
                                                              62/196.4
2011/0108242 A1    5/2011  Eichberger et al.

FOREIGN PATENT DOCUMENTS

| JP | 2000-016070 A | 1/2000 |
| JP | 2003-028522 A | 1/2003 |
| JP | A-2004-183982 | 7/2004 |
| JP | A-2005-082066 | 3/2005 |
| JP | A-2005-090862 | 4/2005 |
| JP | A-2007-069733 | 3/2007 |
| JP | 2009-156544 A | 7/2009 |
| JP | A-2011-518301 | 6/2011 |
| JP | A-2011-247504 | 12/2011 |
| WO | WO 2013/125006 A1 | 8/2013 |

* cited by examiner $PH-PL=k\cdot\Delta L$

PH FROM RECEIVER

PL FROM ACCUMULATOR

PH+α<PL+PW

COOLING DEVICE AND VEHICLE EQUIPPED WITH THE SAME, AND CONTROL METHOD FOR COOLING DEVICE

TECHNICAL FIELD

The present invention relates to a cooling device and a vehicle equipped with the same, as well as a control method for a cooling device, and more particularly to a technique for improving efficiency of a cooling device cooling a heat source utilizing a vapor compression refrigeration cycle.

BACKGROUND ART

In recent years, as one of countermeasures against environmental problems, attention has been paid to a hybrid vehicle, a fuel cell vehicle, an electric vehicle, and the like running with driving force of a motor. In such vehicles, electric devices such as a motor, a generator, an inverter, a converter, and a battery generate heat by transmission and reception of electric power. Therefore, these electric devices need to be cooled. Accordingly, there is a proposed technique for cooling a heat-generating body utilizing a vapor compression refrigeration cycle used as an air-conditioning apparatus for a vehicle.

For example, Japanese Patent Laying-Open No. 2007-69733 (PTD 1) discloses a system for cooling a heat-generating body utilizing a coolant for an air-conditioning apparatus. In the system, a heat exchanger for performing heat exchange with air-conditioning air and a heat exchanger for performing heat exchange with the heat-generating body are arranged in parallel on a coolant passage extending from an expansion valve to a compressor.

Japanese Patent Laying-Open No. 2005-82066 (PTD 2) discloses a cooling system, in which when a coolant is accumulated in an evaporator, a compressor is operated to recover the coolant accumulated in the evaporator, and then, an HV device of the vehicle is started to start the operation of a pump.

CITATION LIST

Patent Document

PTD 1: Japanese Patent Laying-Open No. 2007-069733
PTD 2: Japanese Patent Laying-Open No. 2005-082066
PTD 3: Japanese Patent Laying-Open No. 2005-090862
PTD 4: Japanese Patent Laying-Open No. 06-255351

SUMMARY OF INVENTION

Technical Problem

For a cooling device in which a vapor compression refrigeration cycle is utilized, there is a known structure having a receiver for separating a coolant condensed by a condenser into gas and liquid to store coolant liquid and an accumulator for removing a liquid-phase component of the coolant to be sucked into the compressor.

In the vapor compression refrigeration cycle, the coolant is lowered in temperature by expanding and evaporating the coolant liquid stored in the receiver, and cooling is executed through use of the coolant. Therefore, in order to ensure cooling ability, it is desirable for the coolant liquid to be stored sufficiently in the receiver.

On the other hand, the accumulator is provided for preventing a failure of the compressor due to sucking of the coolant liquid into the compressor. The accumulator separates and stores the liquid-phase component remaining in the coolant used for cooling, and supplies only a gas-phase component of the coolant to the compressor.

The coolant liquid stored in the accumulator cannot be used for cooling as it is. That is, in the case of using the coolant liquid again for cooling, it is necessary to return the coolant liquid from the accumulator to the receiver. In a general vapor compression refrigeration cycle, a technique of moving the coolant liquid from the accumulator to the receiver by operating the compressor to provide the coolant liquid in the accumulator with a superheat degree for evaporation, and liquefying the coolant liquid again through a condenser is adopted.

In this case, however, the compressor needs to be operated even when cooling is unnecessary. Therefore, a load on the compressor may be increased to reduce the overall efficiency of the vapor compression refrigeration cycle.

The present invention was made to solve such a problem, and has an object to, in a cooling device in which a vapor compression refrigeration cycle having a receiver and an accumulator is utilized, reduce a load on a compressor at the time of moving a coolant liquid from the accumulator to the receiver, thereby improving cooling efficiency.

Solution to Problem

A cooling device according to the present invention performs cooling through use of a coolant. The cooling device includes a compressor configured to compress the coolant, first and second heat exchangers, first and second gas-liquid separating units, a decompressor, a switch valve, and a pressure regulating unit. The first heat exchanger is configured to perform heat exchange between the coolant having been compressed and outside air. The first gas-liquid separating unit is configured to separate the coolant having been subjected to the heat exchange by the first heat exchanger into gas and liquid. The decompressor is configured to decompress the coolant from the first gas-liquid separating unit. The second heat exchanger is configured to perform heat exchange between the coolant having been decompressed and air-conditioning air. The second gas-liquid separating unit is configured to separate the coolant having been subjected to the heat exchange by the second heat exchanger into gas and liquid, and supply the coolant to the compressor. The switch valve is configured to switch the first gas-liquid separating unit and the second gas-liquid separating unit into a communicating state to perform coolant transfer of a liquid-phase component from the second gas-liquid separating unit to the first gas-liquid separating unit. The pressure regulating unit is coupled to the first gas-liquid separating unit and the second gas-liquid separating unit and configured to adjust a pressure difference between the first gas-liquid separating unit and the second gas-liquid separating unit.

Preferably, the cooling device further includes a control device. The control device controls the pressure regulating unit after the coolant transfer is terminated such that the pressure difference between the first gas-liquid separating unit and the second gas-liquid separating unit approaches a reference pressure difference which is a pressure difference before performing the coolant transfer.

Preferably, the control device causes the pressure regulating unit to hold the reference pressure difference before starting the coolant transfer. The control device controls the pressure regulating unit after the coolant transfer is terminated such that the pressure difference between the first gas-liquid separating unit and the second gas-liquid separating unit approaches the reference pressure difference having been held.

Preferably, the cooling device further includes first to fourth valves. The first valve is configured to interrupt flow of the coolant from the first heat exchanger into the first gas-liquid separating unit. The second valve is configured to interrupt flow of the coolant from the first gas-liquid separating unit into the decompressor. The third valve is configured to interrupt flow of the coolant from the second heat exchanger into the second gas-liquid separating unit. The fourth valve is configured to interrupt flow of the coolant from the second gas-liquid separating unit into the compressor. The control device causes the first, second, third, and fourth valves to be closed before starting the coolant transfer. The control device causes the first, second, third, and fourth valves to be opened after the coolant transfer is terminated.

Preferably, the pressure regulating unit includes a pressure accumulating unit, a fifth valve configured to switch the first gas-liquid separating unit and the pressure accumulating unit between communication and out-of-communication, and a sixth valve configured to switch the second gas-liquid separating unit and the pressure accumulating unit between communication and out-of-communication. The control device causes the fifth valve and the sixth valve to be opened before starting the coolant transfer, and causes the pressure accumulating unit to hold a resultant pressure difference in the pressure accumulating unit as the reference pressure difference by causing the fifth valve and the sixth valve to be closed. The control device causes the fifth valve and the sixth valve to be opened after the coolant transfer is terminated to make the pressure difference between the first gas-liquid separating unit and the second gas-liquid separating unit approach the reference pressure difference.

Preferably, the pressure accumulating unit has an elastic body. The pressure accumulating unit holds the reference pressure difference with an elastic force of the elastic body.

Preferably, the control device causes the coolant transfer to be started when the compressor is at a stop.

Preferably, the control device causes the coolant transfer to be started when the second heat exchanger has a temperature less than or equal to a reference temperature.

Preferably, the control device causes the coolant transfer to be started after adjusting the second heat exchanger to have a temperature less than or equal to a reference temperature.

Preferably, the control device predicts temperature rise of the second heat exchanger based on an operating state of the cooling device, and causes the coolant transfer to be started when a predicted temperature is less than or equal to a reference temperature.

Preferably, the switch valve is opened when the pressure difference is smaller than a threshold value.

Preferably, the cooling device further includes a cooling unit connected in parallel with the second heat exchanger and configured to cool a heat source with the coolant.

Preferably, the second gas-liquid separating unit is arranged at a position relatively higher than the first gas-liquid separating unit.

Preferably, the first gas-liquid separating unit and the second gas-liquid separating unit are formed integrally such that the second gas-liquid separating unit is located above the first gas-liquid separating unit. The switch valve is provided at a partition wall between the first gas-liquid separating unit and the second gas-liquid separating unit.

Preferably, the switch valve is a check valve which is opened when a pressure on the side of the second gas-liquid separating unit, rather than the switch valve, becomes higher than the pressure on the side of the first gas-liquid separating unit by a prescribed value or more.

A vehicle according to the present invention is capable of running with electric power from a power storage device. The vehicle includes a rotating electric machine, a driving device configured to convert electric power from the power storage device to drive the rotating electric machine, the above-described cooling device, and a cooling unit configured to cool at least one of the power storage device and the driving device through use of the cooling device.

Preferably, the vehicle air-conditions a cabin with the cooling device.

A control method to the present invention is a control method for a cooling device configured to perform cooling through use of a coolant. The cooling device includes a compressor configured to compress the coolant, first and second heat exchangers, first and second gas-liquid separating units, a decompressor, a switch valve, and a pressure regulating unit. The first heat exchanger is configured to perform heat exchange between the coolant having been compressed and outside air. The first gas-liquid separating unit is configured to separate the coolant having been subjected to the heat exchange by the first heat exchanger into gas and liquid. The decompressor is configured to decompress the coolant from the first gas-liquid separating unit. The second heat exchanger is configured to perform heat exchange between the coolant having been decompressed and air-conditioning air. The second gas-liquid separating unit is configured to separate the coolant having been subjected to the heat exchange by the second heat exchanger into gas and liquid, and supply the coolant to the compressor. The switch valve is configured to switch the first gas-liquid separating unit and the second gas-liquid separating unit into a communicating state to perform coolant transfer of a liquid-phase component from the second gas-liquid separating unit to the first gas-liquid separating unit. The pressure regulating unit is coupled to the first gas-liquid separating unit and the second gas-liquid separating unit and configured to adjust a pressure difference between the first gas-liquid separating unit and the second gas-liquid separating unit. The control method includes the steps of detecting the pressure difference between the first gas-liquid separating unit and the second gas-liquid separating unit, holding the pressure difference between the first gas-liquid separating unit and the second gas-liquid separating unit before starting the coolant transfer as a reference pressure difference, performing the coolant transfer, and controlling the pressure regulating unit after the coolant transfer is terminated such that the pressure difference between the first gas-liquid separating unit and the second gas-liquid separating unit approaches the reference pressure difference having been stored.

Advantageous Effects of Invention

According to the present invention, in a cooling device in which a vapor compression refrigeration cycle having a receiver and an accumulator is utilized, a load on a compressor at the time of moving a coolant liquid from the accumulator to the receiver can be reduced to improve cooling efficiency.

DESCRIPTION OF EMBODIMENTS

Figure 1:
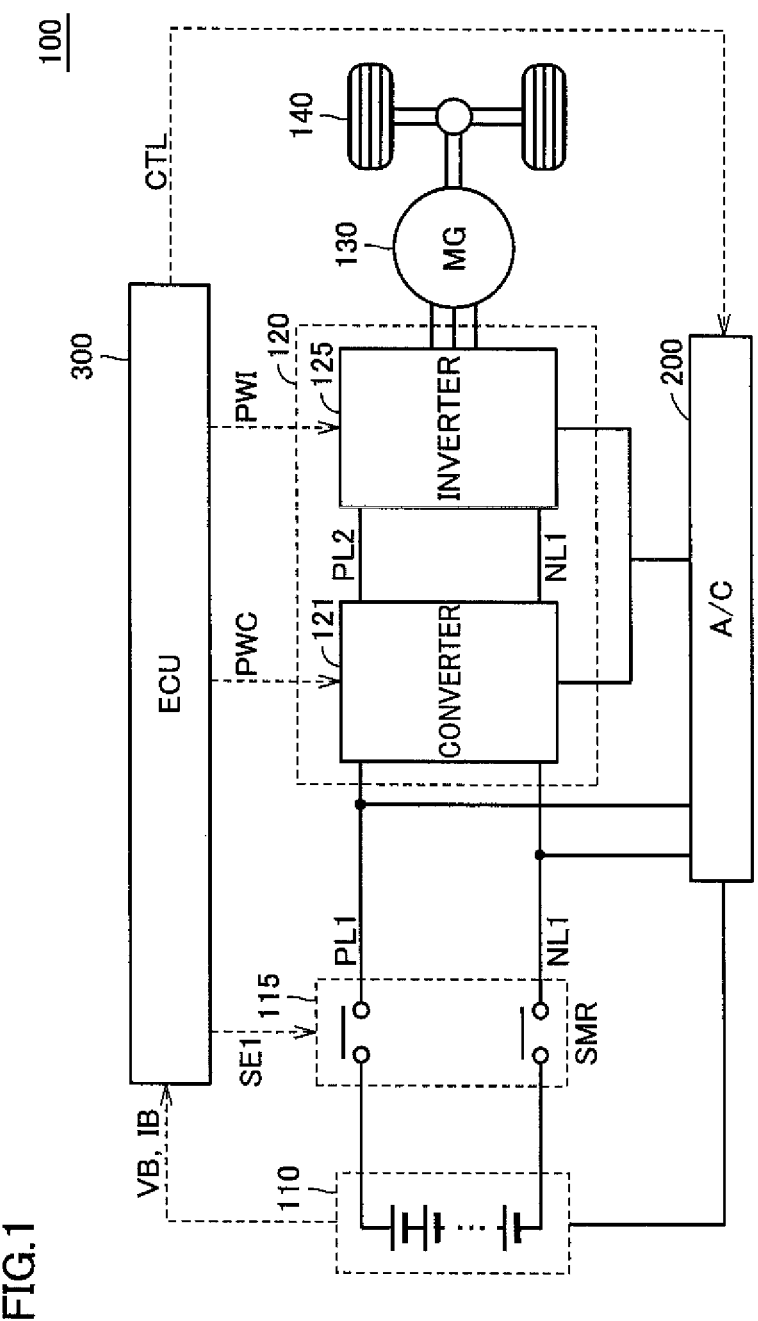
FIG. 1 is an overall block diagram of a vehicle equipped with a cooling device in which a vapor compression refrigeration cycle according to the present embodiment is utilized.

Hereinafter, embodiments of the present invention will be described in detail with reference to the drawings. It is noted that, in the drawings, the same or corresponding portions have the same reference characters allotted, and detailed description thereof will not be repeated.

[Configuration of Vehicle]

FIG. 1 is an overall block diagram of a vehicle 100 equipped with a cooling device 200 in which a vapor compression refrigeration cycle is utilized according to the present embodiment. In the present embodiment, although the case where cooling device 200 is used as an air-conditioner (A/C) for vehicle will be described by way of example, the application of cooling device 200 is not limited thereto. Cooling device 200 is also applicable to, for example, a domestic air-conditioner, a cooling device for industrial equipment, or the like.

Vehicle 100 is a type of vehicle that runs while obtaining running driving force by means of electric power from a power storage device 110. Although the case where vehicle 100 is an electric vehicle will be described with reference to FIG. 1 by way of example, vehicle 100 may be a hybrid vehicle having an internal combustion engine or a fuel-cell vehicle equipped with fuel cells.

In addition to power storage device 110 and cooling device 200, vehicle 100 includes a system main relay (SMR) 115, a PCU (Power Control Unit) 120 as a driving device, a motor generator 130, a driving wheel 140, and an ECU (Electronic Control Unit) 300 as a control device. PCU 120 includes a converter 121 and an inverter 125.

Power storage device 110 is an electric power storage component configured to be rechargeable and dischargeable. Power storage device 110 is configured to include, for example, a secondary battery such as a lithium ion battery, a nickel-metal hydride battery or a lead acid battery, or a power storage element such as an electric double layer capacitor.

Power storage device 110 is connected to PCU 120 via electric power lines PL1 and NL1. Power storage device 110 supplies electric power for generating driving force of vehicle 100, to PCU 120. Power storage device 110 also stores electric power generated by motor generator 130. The output of power storage device 110 is approximately 200V, for example.

Power storage device 110 includes a voltage sensor and a current sensor, neither shown, and outputs a voltage VB and a current IB of power storage device 110, detected by these sensors, to ECU 300.

SMR 115 includes a relay connected across a positive terminal of power storage device 110 and electric power line PL1, as well as a relay connected across a negative terminal of power storage device 110 and electric power line NL1. Based on a control signal SE1 from ECU 300, SMR 115 switches between supply and interruption of electric power between power storage device 110 and PCU 120.

Based on a control signal PWC from ECU 300, converter 121 boosts electric power from power storage device 110 and steps down electric power from inverter 125.

Inverter 125 is connected to converter 121 with electric power lines PL2 and NL1. Inverter 125 is controlled based on a control signal PWI from ECU 300. Inverter 125 converts DC power supplied from converter 121 into AC power to drive motor generator 130.

Motor generator 130 is an AC rotating electric machine, and is, for example, a permanent magnet-type synchronous motor including a rotor with a permanent magnet embedded therein. Furthermore, in the case of regenerative operation, motor generator 130 can generate electric power using rotary force from driving wheel 140. Power storage device 110 is charged with electric power generated by motor generator 130.

Cooling device 200 is supplied with electric power from electric power lines PL1 and NL1. Cooling device 200 is controlled by a control signal CTL from ECU 300 to adjust the air temperature in a cabin of vehicle 100. Coolant passages of cooling device 200 are also arranged in power storage device 110 as well as in converter 121 and inverter 125 within PCU 120. These coolant passages pass by the circumference of a housing accommodating each device or pass through the housing, or are joined to a coolant passage built in a main body of the device. Devices in power storage device 110 and PCU 120 may generate heat by current conducting during running. Therefore, these devices can be cooled by flowing the coolant of cooling device 200 to the coolant passages of these devices as described above. As the coolant of cooling device 200, carbon dioxide, hydrocarbon such as propane or isobutane, ammonia, chlorofluorocarbon, or water can be used, for example.

ECU 300 includes a CPU (Central Processing Unit), a memory device and an input/output buffer, none of which is shown in FIG. 1, and receives a signal from each sensor and outputs a control signal to each device, while exerting control of vehicle 100 and each device. It is to be noted that these kinds of control is not limited to processing by software, but can be processed by dedicated hardware (an electronic circuit).

ECU 300 receives detection values of voltage VB and current IB from the voltage sensor and the current sensor (neither shown) provided for power storage device 110, and calculates the State of Charge SOC of power storage device 110.

ECU 300 performs coolant transfer control for cooling device 200 as will be described below in detail.

It is to be noted that, although FIG. 1 shows a configuration where one control device is provided as ECU 300, it may be configured such that an individual control device is provided for each function or each device to be controlled.

[Configuration of Cooling Device]

First Embodiment

Figure 2:
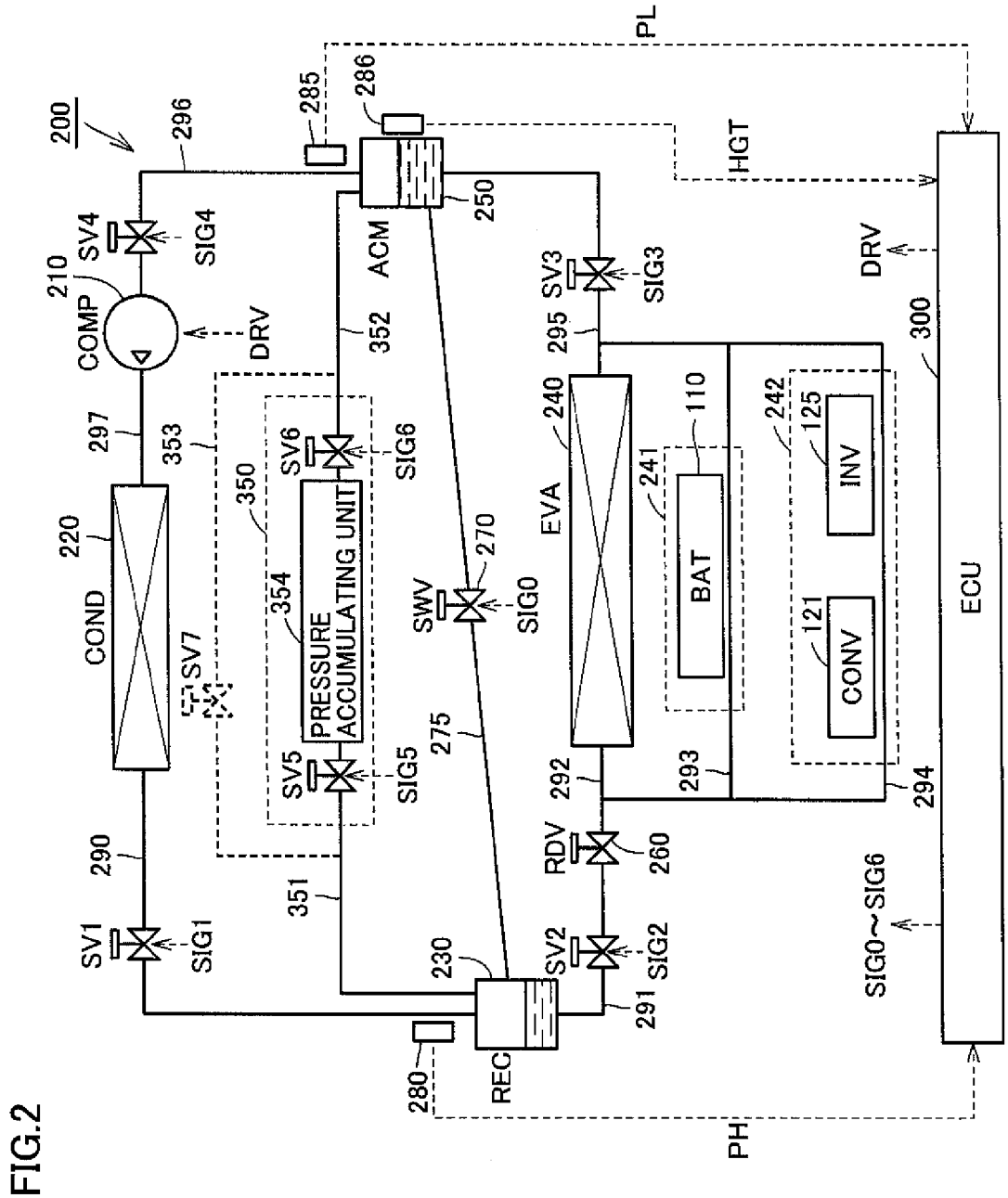
FIG. 2 is a block diagram for describing a configuration of the cooling device in FIG. 1 in a first embodiment.

FIG. 2 is a block diagram for describing an example of a configuration of cooling device 200 shown in FIG. 1 according to the first embodiment. Cooling device 200 includes a compressor 210, a condenser 220, a receiver 230, an evaporator 240, an accumulator 250, and an expansion valve 260. It is to be noted that condenser 220 and evaporator 240 are examples of a "first heat exchanger" and a "second heat exchanger" of the present invention, respectively. Receiver 230 and accumulator 250 are examples of a "first gas-liquid separating unit" and a "second gas-liquid separating unit" of the present invention, respectively. Expansion valve 260 is an example of a "decompressor" of the present invention.

Compressor 210 is operated by motor generator 130 (FIG. 1), an engine or a dedicated motor mounted on vehicle 100 as a power source and adiabatically compresses the coolant gas to obtain superheated coolant gas. Compressor 210 is controlled by a control signal DRV from ECU 300. Compressor 210 takes in and compresses a gas-phase coolant flowing from evaporator 240 through accumulator 250 during operation of the vapor compression refrigeration cycle, and then discharges a high-temperature and high-pressure gas-phase coolant to coolant passage 297. Compressor 210 discharges the coolant to coolant passage 297 to allow circulation of the coolant through the vapor compression refrigeration cycle.

Condenser 220 allows superheated coolant gas compressed by compressor 210 to radiate heat isobarically to an external medium to be condensed and to obtain coolant liquid. The high-pressure gas-phase coolant discharged from compressor 210 is condensed (liquefied) by radiating heat to a periphery of condenser 220 for cooling. Condenser 220 includes, for example, a tube through which the coolant flows, and a fin for performing heat exchange between the coolant flowing through the tube and air around condenser 220.

Condenser 220 performs heat exchange between cooling air and the coolant. The cooling air may be supplied to condenser 220 by natural draft generated by vehicle running. Alternatively, the cooling air may be supplied to condenser 220 by forced draft from an outside-air supplying fan such as a condenser fan or a radiator fan for cooling the engine (neither shown). The heat exchange with outside air in condenser 220 lowers the temperature of the coolant to liquefy the coolant.

The coolant cooled by condenser 220 is supplied to receiver 230 through a coolant passage 290.

The coolant flowing through coolant passage 290 into receiver 230 is separated into a gas-phase coolant and a liquid-phase coolant within receiver 230. When all of the coolant does not evaporate in condenser 220 and the coolant flowing into receiver 230 is in a gas-liquid two-phase state, receiver 230 separates the coolant into coolant liquid in the liquid state and coolant vapor in the gaseous state, and temporarily stores the separated liquid and vapor therein. As for the coolant vapor obtained by gas-liquid separation, the coolant liquid accumulates on the lower side while the coolant vapor accumulates on the upper side within receiver 230.

In this manner, by accumulating a certain amount of coolant liquid in receiver 230, the coolant liquid can be supplied appropriately also while load changes occur in terms of cooling. Therefore, the cooling performance can be stabilized also while load changes occur.

A coolant passage 291 is coupled to the liquid-phase side (e.g., the bottom) of receiver 230. Therefore, only the coolant liquid is caused to flow from receiver 230 through coolant passage 291. In this manner, receiver 230 can reliably separate the gas-phase coolant and the liquid-phase coolant.

Coolant passage 290 or receiver 230 is provided with a pressure sensor 280 for detecting the pressure of compressed coolant. Pressure sensor 280 outputs a detected pressure PH to ECU 300.

Expansion valve 260 allows the high-pressure liquid-phase coolant flowing through coolant passage 291 to be sprayed through a small pore for expansion to achieve a low-temperature, low-pressure mist-like coolant. Expansion valve 260 decompresses the coolant liquid condensed by condenser 220 to produce moist vapor in a gas-liquid mixed state. It is to be noted that the decompressor for decompressing coolant liquid is not limited to expansion valve 260 performing throttle expansion, but may be a capillary tube or a control valve whose opening degree can be controlled.

Evaporator 240 performs heat exchange between the coolant and air-conditioning air, to regulate the temperature of the air-conditioning air. Evaporator 240 includes a tube through which the coolant flows, and a fin for heat exchange between the coolant flowing through the tube and the ambient air of evaporator 240. The coolant in the state of moist vapor flows through the tube. When flowing through the tube, the coolant is evaporated by absorbing heat of the air within the vehicle cabin via the fin as latent heat of evaporation, and then turned into superheated vapor by sensible heat. By driving of the air-conditioning fan that is not shown, air-conditioning air is supplied to evaporator 240. The air-conditioning air may be outside air or may be air in the vehicle cabin.

During the cooling operation, in evaporator 240, the coolant decompressed by expansion valve 260 absorbs heat of evaporation, caused when the moist vapor of the coolant is evaporated to become coolant gas, from the air-conditioning air flowing into the vehicle cabin. The air-conditioning air with a temperature lowered due to absorption of heat by the coolant in evaporator 240 is returned again into the vehicle cabin. In this manner, the vehicle cabin is cooled.

In evaporator 240, the air-conditioning air is cooled, while the coolant absorbs heat from its surroundings by heat transferred from the air-conditioning air and is then heated and evaporated. The coolant evaporated by evaporator 240 is caused to flow to accumulator 250 through a coolant passage 295.

When all of the coolant does not evaporate in evaporator 240 or cooling units 241 and 242 described later and the coolant flowing into accumulator 250 is in a gas-liquid two-phase state, accumulator 250 separates the coolant into coolant liquid in the liquid state and coolant vapor in the gaseous state, and temporarily stores the separated liquid and vapor therein.

Within accumulator 250, the coolant liquid accumulates on the lower side while the coolant vapor accumulates on the upper side. A coolant passage 296 though which coolant vapor flows out of accumulator 250 is coupled to the ceiling portion of accumulator 250 and an inlet of compressor 210. Therefore, only the coolant vapor is caused to flow from accumulator 250 to compressor 210 through coolant passage 296. In this manner, accumulator 250 can reliably separate the gas-phase coolant and the liquid-phase coolant. Accordingly, it becomes possible to prevent the liquid-phase coolant from flowing into compressor 210 and to prevent a failure of compressor 210.

Coolant passage 296 or accumulator 250 is provided with a pressure sensor 285 for detecting the pressure of the coolant flowing into compressor 210. Pressure sensor 285 outputs a detected pressure PL to ECU 300.

Accumulator 250 is further provided with a level sensor 286 for detecting the level height of the coolant liquid stored therein. Level sensor 286 outputs a detected level height HGT to ECU 300. Any type of sensor can be used as level sensor 286. Examples of level sensor 286 include a float-type detector, a capacitance-type detector, a conduction detection-type detector, and the like, for example.

Cooling device 200 further includes cooling units 241 and 242 connected in parallel with evaporator 240 on the route of the coolant flowing from expansion valve 260 toward accumulator 250.

Coolant passages 293 and 294 branch from a coolant passage 292. Coolant passage 293 passes through cooling unit 241 to communicate with coolant passage 295. Coolant passage 294 passes through cooling unit 242 to communicate with coolant passage 295. Part of the coolant decompressed by expansion valve 260 and cooled passes through coolant passages 293 and 294 to flow into coolant passage 295, and absorbs heat of devices included in cooling units 241 and 242.

Electric devices, such as power storage device 110, converter 121, inverter 125 in FIG. 1, and the like, for example, are included in cooling units 241 and 242. In FIG. 2, power storage device 110 is included in cooling unit 241, and converter 121 and inverter 125 of PCU 120 are included in cooling unit 242. It is to be noted that the devices included in cooling units 241 and 242 may be other devices as long as they require cooling. Examples of other devices include motor generator 130 (FIG. 1), an engine (not shown), and the like, for example. These devices which require cooling correspond to a "heat source" according to the invention of the present application.

Coolant passages 290, 291, 295, and 296 are provided with shut-off valves SV1 to SV4, respectively. Shut-off valves SV1 to SV4 are controlled by control signals SIG1 to SIG4 from ECU 300, respectively. When brought into a closed state, shut-off valves SV1 to SV4 each interrupts the flow of coolant in each corresponding coolant passage. Accordingly, the coolant is prevented from flowing in/out of receiver 230 and accumulator 250. It is to be noted that, in the case of a normal cooling operation, shut-off valves SV1 to SV4 are brought into an open position.

In this way, in the vapor compression refrigeration cycle including receiver 230 and accumulator 250 on the circulating passages of the coolant, the coolant liquid is stored in receiver 230 and accumulator 250. As described above, in order to produce a low-temperature, low-pressure mist-like coolant with expansion valve 260, a liquid-phase coolant is supplied to coolant passage 291 from receiver 230. Therefore, in order to ensure cooling ability, it is necessary to store the coolant liquid sufficiently in receiver 230.

On the other hand, a gas-phase coolant is supplied to compressor 210 from accumulator 250. Therefore, in order to return the coolant liquid stored in accumulator 250 to receiver 230, it is necessary to provide the coolant liquid with a necessary superheat degree for evaporation by operating compressor 210 to be condensed by condenser 220. Then, motive power larger than in coolant transport in a normal cooling operation will be required for compressor 210, which can degrade the overall efficiency of the cooling device.

Therefore, according to the first embodiment, cooling device 200 is configured to further include a coolant passage 275 having a switch valve 270 to bring receiver 230 and accumulator 250 into communication with each other. Coolant passage 275 has one end coupled to the liquid-phase side of accumulator 250, and the other end coupled to the gas-phase side of receiver 230.

Switch valve 270 is controlled by a control signal SIG0 from ECU 300 to switch receiver 230 and accumulator 250 between communication and out-of-communication.

Accumulator 250 is arranged at a position where a junction between accumulator 250 and coolant passage 275 is higher than a junction between receiver 230 and coolant passage 275. With such an arrangement, when switch valve 270 is opened to bring receiver 230 and accumulator 250 into communication with each other, the coolant liquid can be moved to receiver 230 utilizing the self-weight of the coolant liquid accumulated in accumulator 250. Accordingly, the compression process by compressor 210 and the condensation process by condenser 220 become unnecessary.

As for the positional relationship between receiver 230 and accumulator 250, it is not essential to locate accumulator 250 higher than receiver 230. For example, if accumulator 250 is arranged lower than receiver 230, coolant passage 275 may be further provided with a pump (not shown) for pumping up the coolant liquid in accumulator 250 to receiver 230. In this case, the coolant liquid in accumulator 250 can be moved to receiver 230 by opening switch valve 270 and operating the pump. However, motive power for driving the pump will be required separately, although being less than motive power for operating compressor 210. Therefore, in terms of efficiency of the cooling device, it is more preferable to arrange accumulator 250 at a position higher than receiver 230 as shown in FIG. 2.

It is to be noted that, generally, since the gas-phase coolant is compressed by compressor 210 when compressor 210 is operated, pressure PH of receiver 230 which is on the discharge side of compressor 210 becomes higher than pressure PL of accumulator 250 which is at the flow-in side of compressor 210. Therefore, in the case where the difference between the pressure on the receiver 230 side and the pressure on the accumulator 250 side is greater than the pressure caused by the self-weight of the coolant liquid in accumulator 250, the coolant liquid in accumulator 250 may not flow into receiver 230 even when switch valve 270 is opened.

Therefore, ECU 300 measures pressures PH and PL from pressure sensors 280 and 285, and when the pressure difference therebetween falls below a predetermined threshold value, opens switch valve 270.

In this way, in the first embodiment, it is possible to return the coolant liquid in accumulator 250 to receiver 230 as it is in the liquid phase by bringing receiver 230 and accumulator 250 into communication with each other. Since the load of compressor 210 can thereby be reduced, the overall efficiency of cooling device 200 can be improved.

On the other hand, when receiver 230 and accumulator 250 are brought into communication with each other to move the coolant liquid, it is necessary to bring the pressure of receiver 230 and the pressure of accumulator 250 into a similar level as described above. Therefore, when the movement of the coolant liquid is completed and the cooling operation is resumed, it is necessary to operate compressor 210 immediately after the resumption until a predetermined pressure difference occurs. Until the pressure difference occurs, however, sufficient cooling ability is not exhibited. Thus, the cooling efficiency may be degraded as a result.

Then, in addition to the above-described structure, cooling device 200 of the first embodiment is further provided with a pressure regulating unit 350 for restoring the pressure difference between receiver 230 and accumulator 250 after moving the coolant liquid from accumulator 250 to receiver 230.

Pressure regulating unit 350 is coupled to the gas-phase side of receiver 230 and the gas-phase side of accumulator 250 with coolant passages 351 and 352, respectively. Pressure regulating unit 350 includes pressure accumulating unit 354 as well as shut-off valves SV5 and SV6.

Shut-off valves SV5 and SV6 are provided for coolant passages 351 and 352, respectively. Shut-off valves SV5 and SV6 are controlled by control signals SIG5 and SIG6 from ECU 300, respectively. Shut-off valve SV5 interrupts the flow of coolant between pressure accumulating unit 354 and receiver 230. Shut-off valve SV6 interrupts the flow of coolant between pressure accumulating unit 354 and accumulator 250. It is to be noted that shut-off valves SV5 and SV6 are brought into the closed state during a normal cooling operation.

Figure 3:
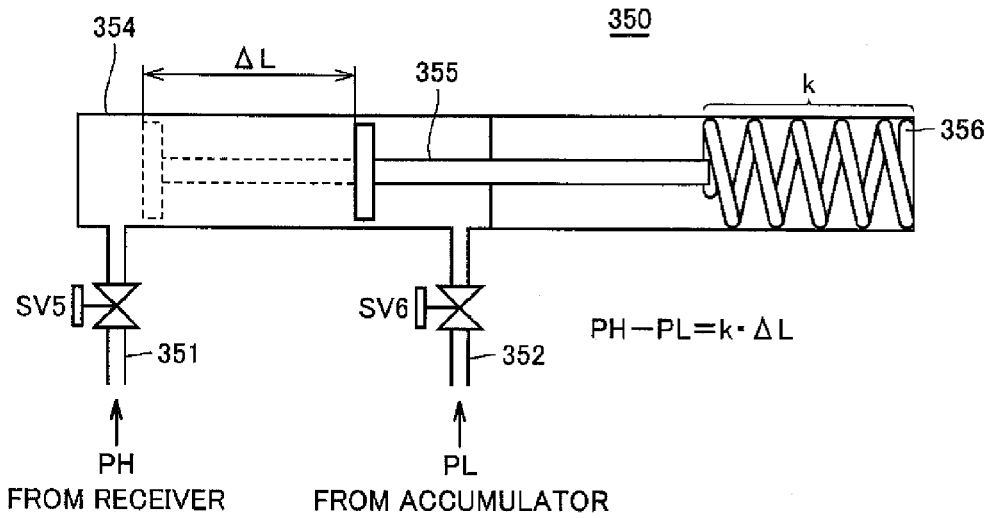
FIG. 3 illustrates a first example of a pressure regulating unit in FIG. 2.

Next, pressure regulating unit 350 will be described in detail with reference to FIG. 3. Pressure accumulating unit 354 of pressure regulating unit 350 shown in FIG. 3 has a structure in which the pressure difference between receiver 230 and accumulator 250 is held mechanically and restored. Pressure accumulating unit 354 generally has a cylinder structure provided with a piston 355 in the cylindrical enclosure. An elastic body 356 such as a spring is connected to a rod-side end of piston 355, for example. The cylinder of pressure accumulating unit 354 has one side coupled to coolant passage 351 and the other side coupled to coolant passage 352 with the head part of piston 355 interposed therebetween. It is to be noted that elastic body 356 is not limited to the spring as shown in FIG. 3, but rubber, a compressible fluid (gas or liquid), or the like may be used.

When shut-off valves SV1 to SV4 in FIG. 2 are closed and furthermore, shut-off valves SV5 and SV6 are opened, the coolant from receiver 230 and accumulator 250 is supplied into the cylinder of pressure accumulating unit 354. On this occasion, piston 355 is moved in accordance with the pressure difference between pressure PH of the coolant from receiver 230 and pressure PL of the coolant from accumulator 250.

For example, immediately after the stop of compressor 210, when shut-off valves SV5 and SV6 are opened if PH>PL holds, piston 355 is moved by a distance ΔL from the state indicated by the broken line to the state indicated by the solid line in accordance with a pressure difference PH−PL. On this occasion, denoting the elastic modulus of elastic body 356 as k, PH−PL=k•ΔL.

When shut-off valves SV5 and SV6 are closed again in this state, the state where a force corresponding to the pressure difference between receiver 230 and accumulator 250 is accumulated in elastic body 356 is maintained. That is, the pressure difference is held. It is to be noted that pressure accumulating unit 354 may be provided with a stopper (not shown) for fixing piston 355 with the pressure accumulated therein.

When shut-off valves SV5 and SV6 are opened after pressure PH of receiver 230 and pressure PL of accumulator 250 reach a similar level (PR≈PL) by moving the coolant liquid from accumulator 250 to receiver 230, the force accumulated in elastic body 356 is released. Then, piston 355 is moved to compress the coolant in receiver 230, so that the pressure in receiver 230 is increased. Accordingly, the pressure difference before the coolant transfer can be restored.

Figure 4:
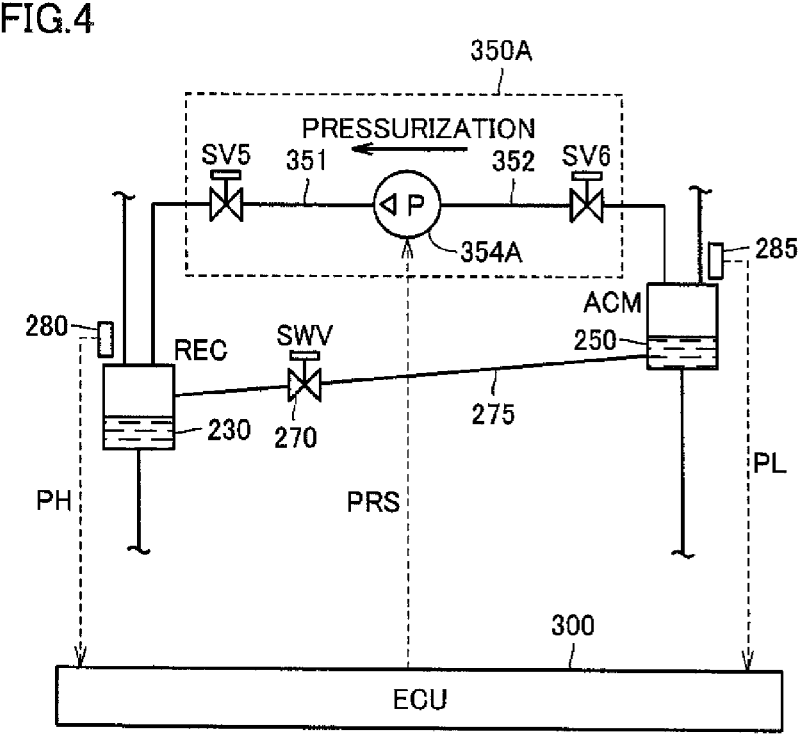
FIG. 4 illustrates a second example of the pressure regulating unit in FIG. 2.

Pressure regulating unit 350 in FIG. 3 shows an example where the pressure difference is mechanically stored in elastic body 356 and restored therefrom. FIG. 4 illustrates another example of storing and restoring the pressure difference.

Referring to FIG. 4, in this example, a pressure regulating unit 350A includes a pump 354A instead of pressure accumulating unit 354. Pump 354A is controlled by a control signal PRS from ECU 300 to cause the gas-phase coolant in accumulator 250 to flow into receiver 230, thereby increasing the pressure in receiver 230.

When moving the coolant liquid from accumulator 250 to receiver 230, shut-off valves SV1 to SV4 in FIG. 2 are closed first, and pressure PH of receiver 230 and pressure PL of accumulator 250 in that state are detected by pressure sensors 280 and 285, respectively. ECU 300 calculates the pressure difference from the detected pressures for storage as a reference pressure difference.

Then, shut-off valves SV5, SV6 and switch valve 270 are opened with pump 354A stopped. Accordingly, the gas-phase coolant in receiver 230 is moved to accumulator 250 through coolant passages 351 and 352, while the coolant liquid in accumulator 250 is moved to receiver 230 through coolant passage 275.

When the coolant transfer from accumulator 250 to receiver 230 is completed, switch valve 270 is closed. Thereafter, by driving pump 354A, the coolant in receiver 230 is pressurized such that the pressure difference between receiver 230 and accumulator 250 approaches the pressure difference stored before the coolant transfer.

When the pressure difference of the coolant reaches a predetermined value, pump 354A is stopped, and shut-off valves SV5 and SV6 are closed. The pressure difference between receiver 230 and accumulator 250 is thus restored to the reference pressure difference before the coolant transfer.

It is to be noted that, in such a structure as shown in FIG. 3 where the pressure difference is mechanically stored and restored, an additional driving force becomes unnecessary. In order to restore the pressure difference, however, it is necessary to sufficiently increase the capacity in the cylinder. Therefore, depending on the receiver's capacity, the pressure accumulating unit may be increased in size, resulting in size increase of the pressure regulating unit as a whole.

On the other hand, with the configuration as shown in FIG. 4, the driving force of the pump becomes necessary in order to restore the pressure difference, although the pressure regulating unit can be relatively reduced in size. It should be noted that, since the operation is conducted with shut-off valves SV1 to SV4 closed, a compressor smaller than compressor 210 can be used, so that a driving force can be made lower than when using compressor 210.

The configuration of the pressure regulating unit is not limited to the above-described examples of FIGS. 3 and 4 as long as it is configured to be capable of storing and restoring the pressure difference. Selection can be made appropriately as to which configuration is adopted for the pressure regulating unit, in consideration of the capacity of the receiver, that of the accumulator, the size of the whole device, and the like.

Figure 5:
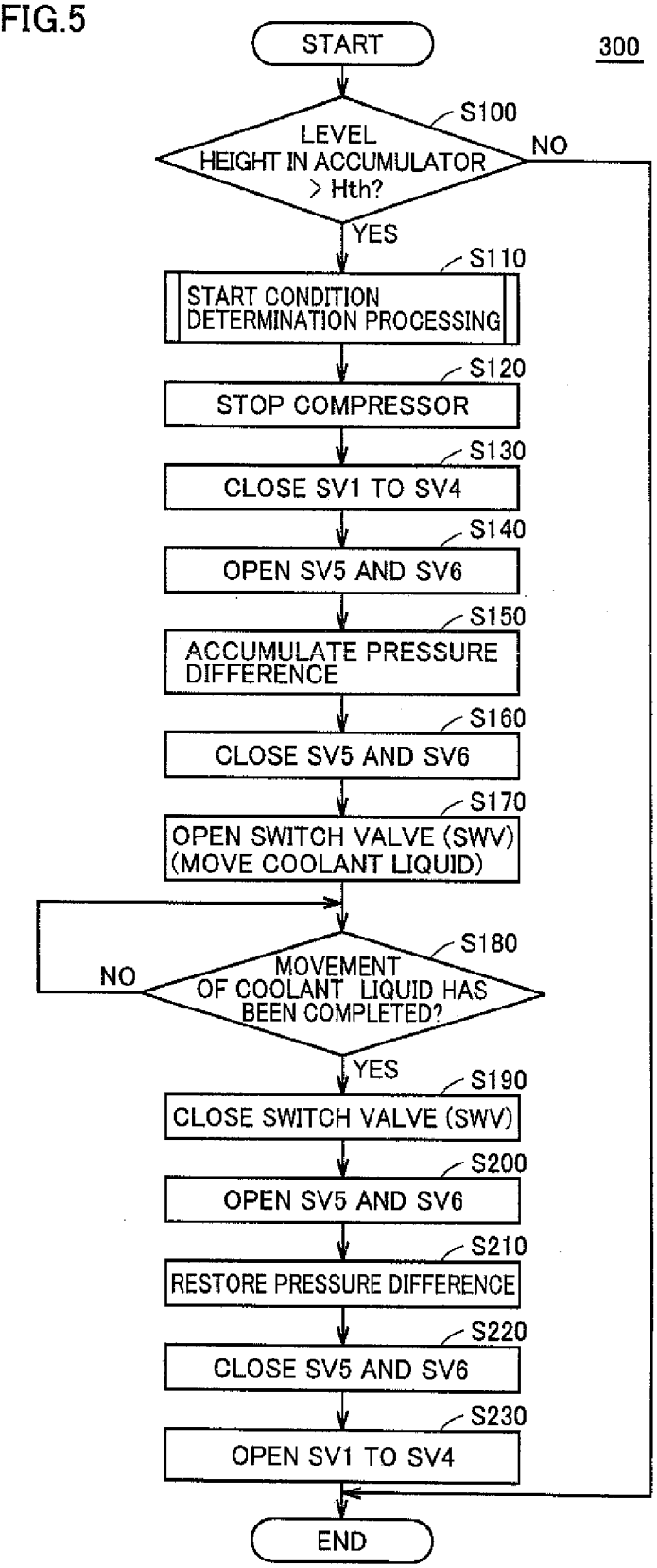
FIG. 5 is a flowchart for describing coolant transfer control executed by ECU in the first embodiment.

FIG. 5 is a flowchart for describing coolant transfer control executed by ECU 300 in the first embodiment. Each step in the flowchart shown in FIG. 5 is achieved by a program previously stored in ECU 300 being revoked from a main routine and executed in a predetermined cycle or in response to satisfaction of predetermined conditions. Alternatively, processing of some steps can also be achieved by building dedicated hardware (an electronic circuit). It is to be noted that the flowchart of FIG. 5 illustrates an example in the case of pressure regulating unit 350 shown in FIG. 3 is used.

Referring to FIGS. 2 and 5, in step (hereinafter, step will be abbreviated to S) 100, ECU 300 determines whether or not level height HGT detected by level sensor 286 is higher than a predetermined threshold value Hth.

Since it is not necessary to move the coolant liquid in accumulator 250 to receiver 230 when level height HGT is less than or equal to threshold value Hth (NO in S100), ECU 300 terminates the process skipping subsequent processing.

When level height HGT is higher than threshold value Hth (YES in S100), the process is advanced to S110, and ECU 300 determines that the coolant liquid in accumulator 250 needs to be moved to receiver 230. Then, the process is advanced to S110, and it is determined whether or not the start condition for moving the coolant liquid from accumulator 250 to receiver 230 is satisfied.

As the specific condition in S110, such a condition as shown in examples of FIGS. 6 to 9 can be employed, for example.

Figure 6:
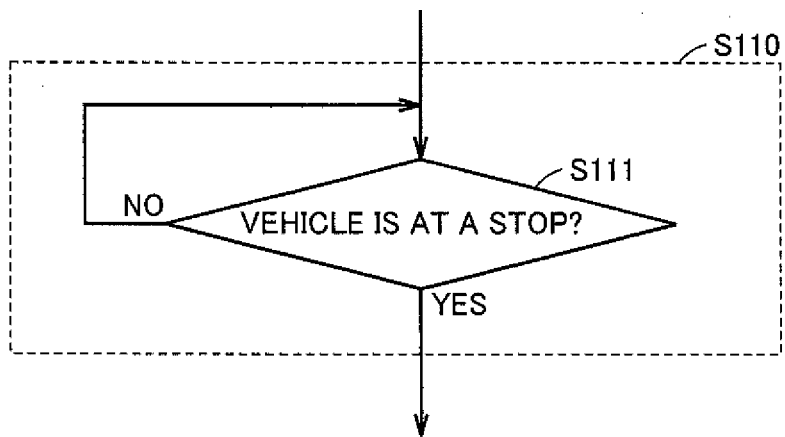
FIG. 6 illustrates a first example of step S110 in FIG. 5.

In the example of FIG. 6, step S110 includes step S111. In S111, ECU 300 determines whether or not vehicle 100 is at a stop. Since motor generator 130 is in the stopped state when vehicle 100 is at a stop, there is little current flowing into the circuit. Therefore, devices such as power storage device 110 and PCU 120 less rise in temperature, a temporary stop of the cooling operation by cooling device 200 for moving the coolant liquid is less likely to affect the temperature rise of the devices.

When vehicle 100 is not at a stop (NO in S111), the process is returned to S111, and ECU 300 waits for vehicle 100 to be brought into the stopped state. On the other hand, when vehicle 100 is at a stop (YES in S111), the process is advanced to subsequent S120.

Figure 7:
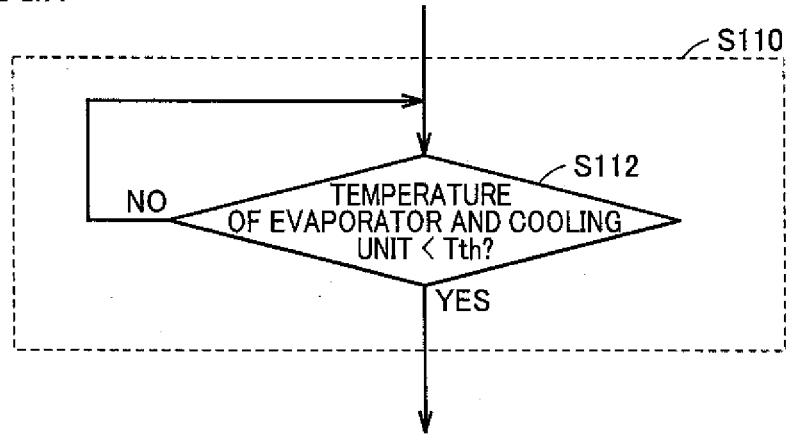
FIG. 7 illustrates a second example of step S110 in FIG. 5.

In the example of FIG. 7, step S110 includes step S112. In S112, ECU 300 determines whether or not the temperature of each of the evaporator and cooling units 241, 242 is lower than a predetermined reference temperature Tth. When evaporator 240 and cooling units 241, 242 are sufficiently low in temperature, the necessity for cooling by cooling device 200 is low. Thus, a temporary stop of the cooling operation by cooling device 200 for moving the coolant liquid is less likely to affect the temperature rise of the devices.

When the temperature of evaporator 240 and cooling units 241, 242 is more than or equal to reference temperature Tth (NO in S112), the process is returned to S112, and ECU 300 waits for the temperature of evaporator 240 and cooling units 241, 242 to fall below reference temperature Tth. On the other hand, when the temperature of evaporator 240 and cooling units 241, 242 is lower than reference temperature Tth (YES in S112), the process is advanced to subsequent S120.

Figure 8:
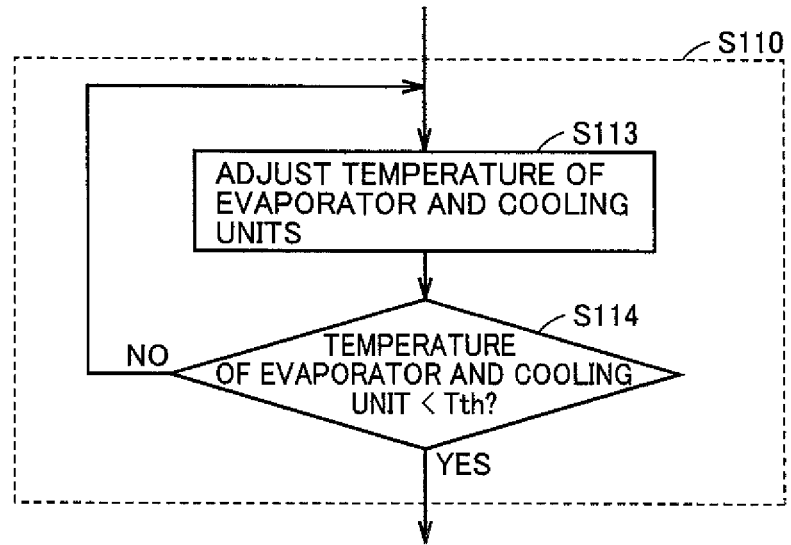
FIG. 8 illustrates a third example of step S110 in FIG. 5.

In the example of FIG. 8, step S110 includes steps S113 and S114. In S113, ECU 300 controls expansion valve 260 and a decompression valve (not shown) provided for coolant passage 295 to adjust the temperature of evaporator 240 and cooling units 241, 242 to be lowered. When the temperature of evaporator 240 and cooling units 241, 242 is more than or equal to reference temperature Tth (NO in S114), the process is returned to S113, and adjustment is continued until the temperature of evaporator 240 and cooling units 241, 242 becomes lower than reference temperature Tth. When the temperature of evaporator 240 and cooling units 241, 242 becomes lower than reference temperature Tth (YES in S114), the process is advanced to subsequent S120.

In FIG. 8, by actively lowering the temperature of evaporator 240 and cooling units 241, 242, a temporary stop of the cooling operation by cooling device 200 can be made at an early stage.

Figure 9:
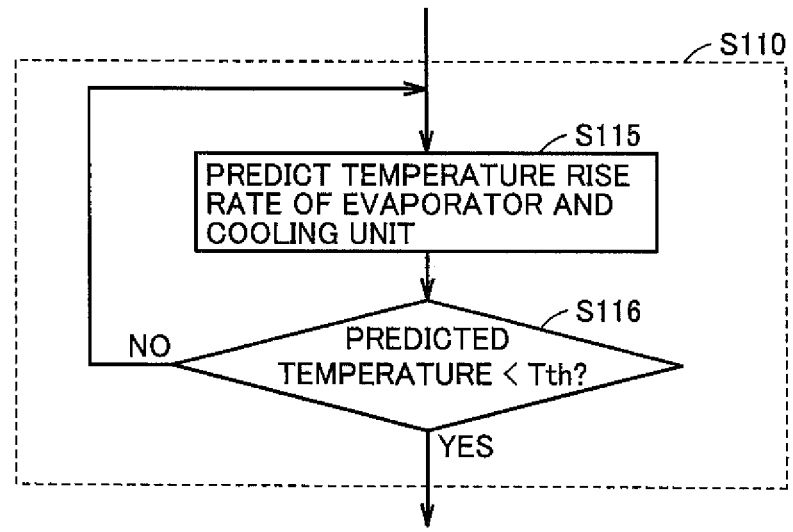
FIG. 9 illustrates a fourth example of step S110 in FIG. 5.

In the example of FIG. 9, step S110 includes steps S115 and S116. In S115, ECU 300 predicts the temperature rise rate of evaporator 240 and cooling units 241, 242 using the outside air temperature, the temperature of condenser 220 cooled by wind given by running of the vehicle, and the like, based on a map or the like previously obtained by experiment or the like. Then, it is determined in S116 whether or not the predicted temperature of evaporator 240 and cooling units 241, 242 predicted by means of this temperature rise rate is lower than reference temperature Tth.

When the predicted temperature of evaporator 240 and cooling units 241, 242 is more than or equal to reference temperature Tth (NO in S116), the process is returned to S115, and ECU 300 waits for the predicted temperature of evaporator 240 and cooling units 241, 242 to fall below reference temperature Tth. On the other hand, when the predicted temperature of evaporator 240 and cooling units 241, 242 is lower than reference temperature Tth (YES in S116), the process is advanced to subsequent S120.

It is to be noted that, in the case of the start conditions shown in FIGS. 8 and 9, it is not necessarily required to bring the vehicle into the stopped state. When the temperature rise of the devices can be suppressed low, the movement of the coolant liquid can be started even while the vehicle is running.

Referring again to FIG. 5, when the start condition for moving the coolant liquid in S110 is met, the process is advanced to S120, and ECU 300 stops compressor 210.

Then, in S130, ECU 300 causes shut-off valves SV1 to SV4 to be closed to interrupt the flow of the coolant into/out of receiver 230 and accumulator 250.

Then, in S140, ECU 300 causes shut-off valves SV5 and SV6 to be opened to bring receiver 230 and pressure accumulating unit 354 into the communicating state and bring accumulator 250 and pressure accumulating unit 354 into the communicating state. Accordingly, as described with reference to FIG. 3, the pressure difference between receiver 230 and accumulator 250 before the coolant liquid movement is accumulated in pressure accumulating unit 354 (S150).

When the accumulation of the pressure difference in pressure accumulating unit 354 is completed, ECU 300 in S160 causes the pressure difference to be held by causing shut-off valves SV5 and SV6 to be closed.

Then, in S170, ECU 300 causes switch valve 270 to be opened to move the coolant liquid from accumulator 250 to receiver 230.

It is to be noted that, when the pressure on the receiver 230 side is still higher than the pressure on the accumulator 250 side even after causing the pressure difference to be held in pressure accumulating unit 354, the coolant liquid may not flow from accumulator 250 into receiver 230 as it is even if switch valve 270 is opened. In such a case, for example, a bypass route (coolant passage 353 and a shut-off valve SV7) as indicated by broken lines in FIG. 2 may be provided, and shut-off valve SV7 may be opened. Accordingly, the gasphase coolant in receiver 230 can be moved to accumulator 250, and the coolant liquid can be caused to flow from accumulator 250 to receiver 230.

In S180, ECU 300 determines whether or not the movement of the coolant liquid from accumulator 250 to receiver 230 has been completed. This determination may be made based on whether or not a predetermined time passed, or may be made based on whether or not level height HGT detected by level sensor 286 has been lowered to a predetermined height or below, for example.

When the movement of the coolant liquid has not been completed (NO in S180), the process is advanced to S180, and ECU 300 waits for completion of the movement of the coolant liquid.

On the other hand, when the movement of the coolant liquid has been completed (YES in S180), the process is advanced to S190, and ECU 300 causes switch valve 270 to be closed. On this occasion, when the above-described bypass circuit is provided, ECU 300 also causes shut-off valve SV7 to be closed.

Thereafter, in S200, ECU 300 causes shut-off valves SV5 and SV6 to be opened. Piston 355 (FIG. 3) of pressure accumulating unit 354 thus returns to its original position, so that the coolant in receiver 230 is pressurized. The pressure difference between receiver 230 and accumulator 250 is thereby brought close to the pressure difference before the coolant liquid movement (S210).

Then, ECU 300 in S220 causes shut-off valves SV5 and SV6 to be closed, and in S230 causes shut-off valves SV1 to SV4 to be opened. Thereafter, ECU 300 causes compressor 210 to operate to resume the cooling operation according to necessity.

By exerting control in accordance with the processing as described above, in the cooling device in which the vapor compression refrigeration cycle having the receiver and the accumulator is used, the coolant liquid in the accumulator can be moved to the receiver without driving the compressor. After the movement of the coolant liquid from the accumulator to the receiver, the pressure difference between the receiver and the accumulator can be brought close to the pressure difference before the coolant movement by means of the pressure regulating unit. Accordingly, recovery of the pressure difference by the compressor is not required when the cooling operation is resumed. Thus, it becomes possible to further reduce the load on the compressor. Furthermore, by providing the shut-off valves for the coolant passages coupled to the receiver and the accumulator, the total capacity of the route in which the coolant is included can be reduced in restoration of the pressure difference by the pressure regulating unit. Therefore, the pressure regulating unit can be reduced in size.

Second Embodiment

In the first embodiment, the configuration where the receiver and the accumulator are brought into communication with each other via the coolant passages has been described.

In a second embodiment, the configuration where the accumulator and the receiver have an integral structure such that the accumulator is located above the receiver will be described.

Figure 10:
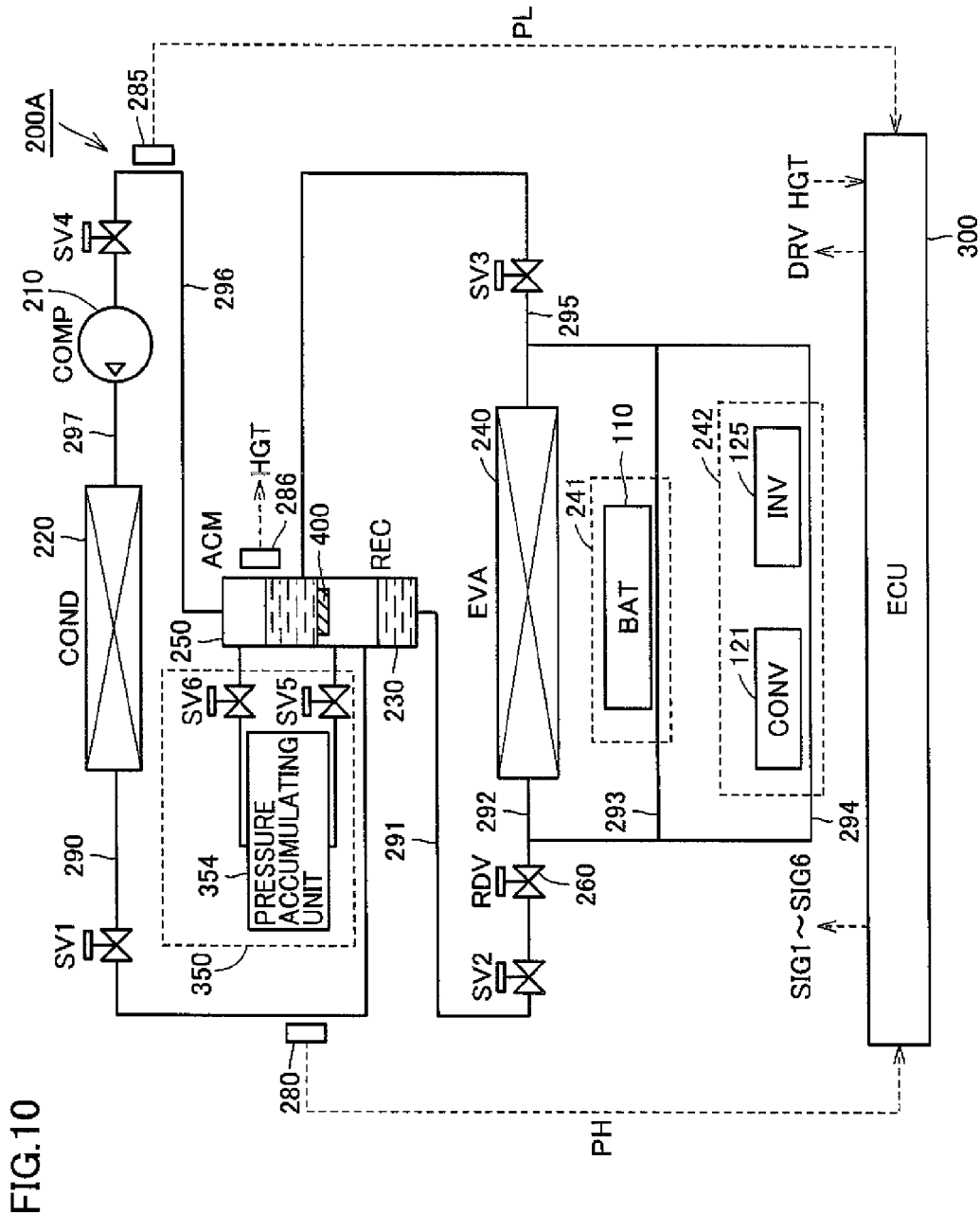
FIG. 10 illustrates a configuration of a cooling device according to a second embodiment.

FIG. 10 illustrates a configuration of a cooling device 200A according to the second embodiment. In cooling device 200A, receiver 230 and accumulator 250 have an integral structure such that accumulator 250 is located above receiver 230. A switch valve 400 is provided for a partition wall which separates receiver 230 and accumulator 250. It is to be noted that, in FIG. 10, description of elements overlapping those of FIG. 2 will not be repeated.

Switch valve 400 is a check valve opened/closed in accordance with the pressure difference between the pressure of accumulator 250 (pressure of a gas-phase coolant+pressure of a liquid-phase coolant) and the pressure of a gas-phase coolant in receiver 230. An example of the configuration of switch valve 400 will be described below with reference to FIGS. 11 and 12.

Figure 11:
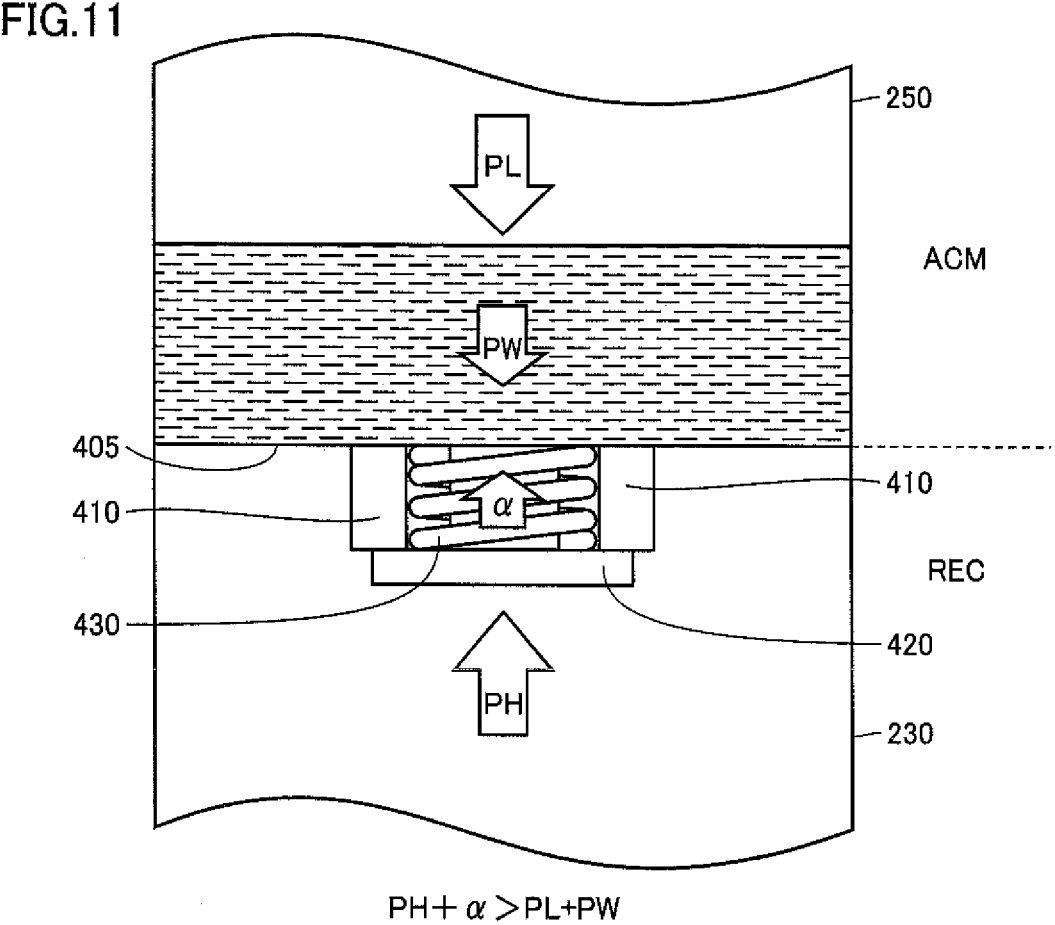
FIG. 11 is a first diagram for describing an operation of a switch valve in the cooling device in FIG. 10.
Figure 12:
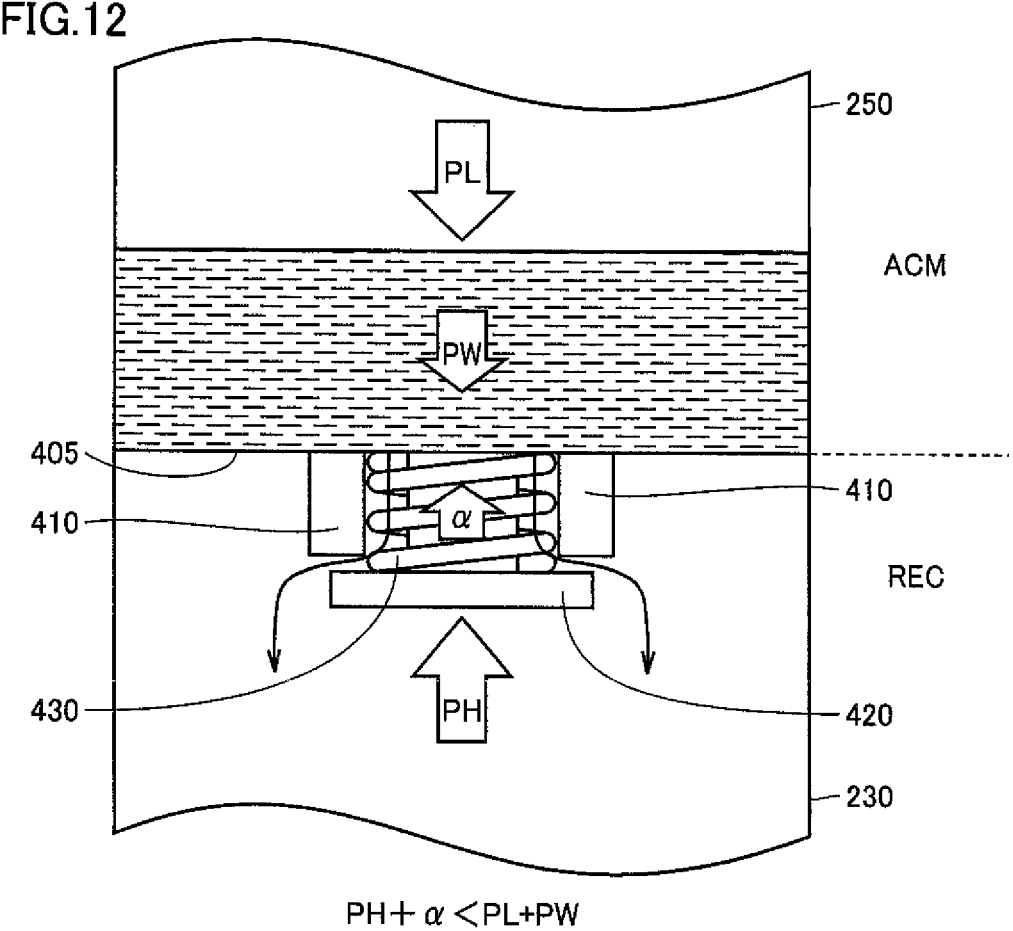
FIG. 12 is a second diagram for describing an operation of the switch valve in the cooling device in FIG. 10.

FIG. 11 illustrates the state where switch valve 400 is closed, and FIG. 12 illustrates the state where switch valve 400 is opened.

Referring to FIGS. 10 and 11, switch valve 400 includes an outlet 410, a closure lid 420, and a spring 430.

Outlet 410 is provided at a partition wall 405 which separates receiver 230 and accumulator 250. When closure lid 420 is in the open state, receiver 230 and accumulator 250 are brought into the communicating state. Spring 430 biases, to closure lid 420, a force in a direction in which closure lid 420 is pressed against outlet 410.

When compressor 210 is operating, pressure PH of the gas-phase coolant in receiver 230 becomes larger than pressure PL of the gas-phase coolant in accumulator 250. When the sum of pressure PH of the gas-phase coolant in receiver 230 and a biasing force $\alpha$ of spring 430 is larger than the sum of pressure PL of the gas-phase coolant in accumulator 250 and a pressure PW caused by the self-weight of the liquid-phase coolant (PH+$\alpha$>PL+PW), closure lid 420 is pressed against outlet 410 to bring receiver 230 and accumulator 250 out of communication. The coolant liquid in accumulator 250 is thus kept in accumulator 250.

When compressor 210 is stopped, the pressure difference between pressure PH and pressure PL decreases gradually with time. Then, as shown in FIG. 12, when the sum of pressure PH of the gas-phase coolant in receiver 230 and biasing force $\alpha$ of spring 430 becomes smaller than the sum of pressure PL of the gas-phase coolant in accumulator 250 and pressure PW caused by the self-weight of the liquid-phase coolant (PH+$\alpha$<PL+PW), closure lid 420 opens. This causes receiver 230 and accumulator 250 to communicate with each other, so that the coolant liquid in accumulator 250 is moved to receiver 230 through a route indicated by an arrow AR1.

Thereafter, when the coolant liquid is moved to increase the pressure on the receiver 230 side (PH+$\alpha$>PL+PW), closure lid 420 closes.

In this manner, by providing the integral structure of the receiver and the accumulator and providing the partition wall therebetween with the check valve that allows the flow in the direction from the accumulator to the receiver, the receiver and the accumulator can be reduced in size. Furthermore, with such a structure, the coolant liquid in the accumulator can be moved to the receiver in accordance with the pressure difference between the receiver and the accumulator, without execution of active control by the ECU.

By making an adjustment to attain the pressure difference before the movement of the coolant liquid by the pressure regulating unit after the movement of the coolant liquid from the receiver to the accumulator, a pressurizing operation by the compressor is not required at the time of resumption of a cooling operation, which can improve cooling efficiency.

It is to be noted that the configuration of the check valve is not limited to the configurations shown in FIGS. 11 and 12 as long as the configuration enables communication only in one direction in accordance with a predetermined pressure difference. As another configuration of the check valve, a configuration may be adopted in which a plate having elasticity such as a rubber plate, for example, is provided at the partition wall on the receiver side.

In the description of FIGS. 11 and 12, the case where biasing force $\alpha$ of spring 430 is in the direction in which closure lid 420 is pressed against outlet 410 has been described by way of example. The direction of biasing force $\alpha$ of spring 430 may be varied depending on the configuration of the system. For example, in the case of bringing receiver 230 and accumulator 250 into the communicating state as soon as possible after compressor 210 is stopped, the biasing force of spring 430 may be set to a direction in which closure lid 420 opens.

The switch valve according to the first embodiment may be a check valve, and in contrast, the switch valve according to the second embodiment may be a control valve that can be controlled by the ECU.

It should be understood that the embodiments disclosed herein are illustrative and non-restrictive in every respect. The scope of the present invention is defined by the claims not by the description above, and is intended to include any modification within the meaning and scope equivalent to the terms of the claims.

REFERENCE SIGNS LIST 100 vehicle; 110 power storage device; 120 PCU; 121 converter; 125 inverter; 130 motor generator; 140 driving wheel; 200, 200A cooling device; 210 compressor; 220 condenser; 230 receiver; 240 evaporator; 241, 242 cooling unit; 250 accumulator; 260 expansion valve; 270, 400 switch valve; 275, 290-297, 351-353 coolant passage: 280, 285 pressure sensor; 286 level sensor; 300 ECU; 350, 350A pressure regulating unit; 354 pressure accumulating unit; 354A pump; 355 piston; 356 elastic body; 405 partition wall; 410 outlet; 420 closure lid; 430 spring; PL1, PL2, NL1 electric power line; SV1-SV7 shut-off valve.

The invention claimed is:

1. A cooling device configured to perform cooling through use of a coolant, comprising:
   a compressor configured to compress the coolant;
   a first heat exchanger configured to perform heat exchange between the coolant having been compressed and outside air;
   a first gas-liquid separating unit configured to separate the coolant having been subjected to the heat exchange by the first heat exchanger into gas and liquid;
   a decompressor configured to decompress the coolant from the first gas-liquid separating unit;
   a second heat exchanger configured to perform heat exchange between the coolant having been decompressed and air-conditioning air;
   a second gas-liquid separating unit configured to separate the coolant having been subjected to the heat exchange by the second heat exchanger into gas and liquid, and supply the coolant to the compressor;
   a switch valve configured to switch the first gas-liquid separating unit and the second gas-liquid separating unit into a communicating state to perform coolant transfer of a liquid-phase component from the second gas-liquid separating unit to the first gas-liquid separating unit;
   a pressure regulating unit coupled to the first gas-liquid separating unit and the second gas-liquid separating unit and configured to adjust a pressure difference between the first gas-liquid separating unit and the second gas-liquid separating unit; and
   a control device,
   the control device causing the pressure regulating unit to hold the pressure difference between the first gas-liquid separating unit and the second gas-liquid separating unit before starting the coolant transfer as a reference pressure difference,
   the control device controlling the pressure regulating unit after the coolant transfer is terminated such that the pressure difference between the first gas-liquid separating unit and the second gas-liquid separating unit approaches the reference pressure difference having been held.

2. The cooling device according to claim 1, further comprising:
   a first valve configured to interrupt flow of the coolant from the first heat exchanger into the first gas-liquid separating unit;
   a second valve configured to interrupt flow of the coolant from the first gas-liquid separating unit into the decompressor;
   a third valve configured to interrupt flow of the coolant from the second heat exchanger into the second gas-liquid separating unit; and
   a fourth valve configured to interrupt flow of the coolant from the second gas-liquid separating unit into the compressor, wherein
   the control device causes the first, second, third, and fourth valves to be closed before starting the coolant transfer, and
   the control device causes the first, second, third, and fourth valves to be opened after the coolant transfer is terminated.

3. The cooling device according to claim 2, wherein
   the pressure regulating unit includes
   a pressure accumulating unit,
   a fifth valve configured to switch the first gas-liquid separating unit and the pressure accumulating unit between communication and out-of-communication, and
   a sixth valve configured to switch the second gas-liquid separating unit and the pressure accumulating unit between communication and out-of-communication,
   the control device causes the fifth valve and the sixth valve to be opened before starting the coolant transfer, and causes the pressure accumulating unit to hold a resultant pressure difference in the pressure accumulating unit as the reference pressure difference by causing the fifth valve and the sixth valve to be closed, and
   the control device causes the fifth valve and the sixth valve to be opened after the coolant transfer is terminated to make the pressure difference between the first gas-liquid separating unit and the second gas-liquid separating unit approach the reference pressure difference.

4. The cooling device according to claim 3, wherein
   the pressure accumulating unit has an elastic body, and
   the pressure accumulating unit holds the reference pressure difference with an elastic force of the elastic body.

5. The cooling device according to claim 2, wherein the control device causes the coolant transfer to be started when the compressor is at a stop.

6. The cooling device according to claim 2, wherein the control device causes the coolant transfer to be started when the second heat exchanger has a temperature less than or equal to a reference temperature.

7. The cooling device according to claim 2, wherein the control device causes the coolant transfer to be started after adjusting the second heat exchanger to have a temperature less than or equal to a reference temperature.

8. The cooling device according to claim 2, wherein the control device predicts temperature rise of the second heat exchanger based on an operating state of the cooling device, and causes the coolant transfer to be started when a predicted temperature is less than or equal to a reference temperature.

9. The cooling device according to claim 1, wherein the switch valve is opened when the pressure difference is smaller than a threshold value.

10. The cooling device according to claim 1, further comprising a cooling unit connected in parallel with the second heat exchanger and configured to cool a heat source with the coolant.

11. The cooling device according to claim 1, wherein the second gas-liquid separating unit is arranged at a position relatively higher than the first gas-liquid separating unit.

12. The cooling device according to claim 11, wherein
   the first gas-liquid separating unit and the second gas-liquid separating unit are formed integrally such that the second gas-liquid separating unit is located above the first gas-liquid separating unit, and
   the switch valve is provided at a partition wall between the first gas-liquid separating unit and the second gas-liquid separating unit.

13. The cooling device according to claim 11, wherein the switch valve is a check valve which is opened when a pressure on the side of the second gas-liquid separating unit, rather than the switch valve, becomes higher than the pressure on the side of the first gas-liquid separating unit by a prescribed value or more.

14. A vehicle capable of running with electric power from a power storage device, comprising:
- a rotating electric machine;
- a driving device configured to convert electric power from the power storage device to drive the rotating electric machine;
- the cooling device as defined in claim 1; and
- a cooling unit configured to cool at least one of the power storage device and the driving device through use of the cooling device.

15. The vehicle according to claim 14, wherein the vehicle air-conditions a cabin with the cooling device.

16. A control method for a cooling device configured to perform cooling through use of a coolant,
- the cooling device including
- a compressor configured to compress the coolant,
- a first heat exchanger configured to perform heat exchange between the coolant having been compressed and outside air,
- a first gas-liquid separating unit configured to separate the coolant having been subjected to the heat exchange by the first heat exchanger into gas and liquid,
- a decompressor configured to decompress the coolant from the first gas-liquid separating unit,
- a second heat exchanger configured to perform heat exchange between the coolant having been decompressed and air-conditioning air,
- a second gas-liquid separating unit configured to separate the coolant having been subjected to the heat exchange by the second heat exchanger into gas and liquid, and supply the coolant to the compressor,
- a switch valve configured to switch the first gas-liquid separating unit and the second gas-liquid separating unit into a communicating state to perform coolant transfer of a liquid-phase component from the second gas-liquid separating unit to the first gas-liquid separating unit, and
- a pressure regulating unit coupled to the first gas-liquid separating unit and the second gas-liquid separating unit and configured to adjust a pressure difference between the first gas-liquid separating unit and the second gas-liquid separating unit,
- the control method comprising the steps of:
- holding the pressure difference between the first gas-liquid separating unit and the second gas-liquid separating unit before starting the coolant transfer as a reference pressure difference;
- performing the coolant transfer; and
- controlling the pressure regulating unit after the coolant transfer is terminated such that the pressure difference between the first gas-liquid separating unit and the second gas-liquid separating unit approaches the reference pressure difference having been held.

17. The cooling device according to claim 12, wherein the switch valve is a check valve which is opened when a pressure on the side of the second gas-liquid separating unit, rather than the switch valve, becomes higher than the pressure on the side of the first gas-liquid separating unit by a prescribed value or more.

* * * * *